United States Patent [19]
Korah et al.

[11] Patent Number: 6,115,111
[45] Date of Patent: Sep. 5, 2000

[54] SEMICONDUCTOR LASER BASED SENSING DEVICE

[76] Inventors: John K. Korah, 569 West St., Louisville, Colo. 80027; Kristina M. Johnson, 7217 Coyote Trail, Longmont, Colo. 80503; Valentin Morozov, 3777 Chiltron Ct., San Jose, Calif. 95111; Chong Chang Mao, 3400 West Park Blvd., Apt. 2066, Plano, Tex. 75075

[21] Appl. No.: 09/166,287

[22] Filed: Oct. 5, 1998

[51] Int. Cl.[7] .............................. G01C 3/08; G01B 11/02; G01B 11/14
[52] U.S. Cl. ...................... 356/4.01; 356/4.04; 356/4.05; 356/5.1; 356/356; 356/373
[58] Field of Search .................... 356/5.01–5.15, 356/4.01, 376, 4.04, 4.05, 4.09, 373, 356

[56] References Cited

U.S. PATENT DOCUMENTS

| | | | |
|---|---|---|---|
| 3,567,320 | 3/1971 | Chitayat . | |
| 3,728,482 | 4/1973 | Wren | 178/7.2 |
| 3,932,733 | 1/1976 | Olsen et al. | 235/151 |
| 3,937,575 | 2/1976 | Bateman . | |
| 4,000,417 | 12/1976 | Adkisson et al. | 250/201 |
| 4,588,297 | 5/1986 | Inazaki et al. | 356/376 |
| 4,666,295 | 5/1987 | Duvall et al. . | |
| 4,927,263 | 5/1990 | de Groot . | |
| 5,020,901 | 6/1991 | de Groot . | |
| 5,229,828 | 7/1993 | Wiklund . | |
| 5,285,466 | 2/1994 | Tabatabaie | 372/50 |
| 5,491,712 | 2/1996 | Lin et al. | 372/50 |
| 5,619,318 | 4/1997 | Yamamoto et al. | 356/32 |
| 5,648,979 | 7/1997 | Mun et al. | 372/50 |

OTHER PUBLICATIONS

Robert A. Morgan, "VCSEL: A New Twist in Semiconductor Lasers;" Photonics Spectra, Dec. 19??; pp. 89–91.

K.D. Choquette, et al., "Detector–Enclosed Vertical–Cavity Surface Emitting Lasers;" Electronic Letters, vol. 29, No. 5, Mar. 4, 1993, pp. 466–467.

G. Hasnain et al., "Monolithic Integration of Photodetector with Vertical Cavity Surface Emitting Laser;" Electronic Letters, vol. 27, No. 18, Aug. 29, 1991, pp. 1630–1632.

Richard N. Zar, "Editorial: Knowledge and Distributed Intelligence;" Science, vol. 275, Feb. 21, 1997, pp. 104, 313–314.

*Primary Examiner*—Stephen C. Buczinski
*Attorney, Agent, or Firm*—Fleshner & Kim, LLP

[57] ABSTRACT

A system for determining a distance to a target object or a displacement of a target object monitors electrical characteristics of a semiconductor laser aimed at the object. Light emitted from the laser is reflected from a surface of the object back into the laser. The amount of reflected light reaching the laser affects electrical characteristics of the laser. Because the amount of reflected light reaching the laser depends on the distance to the target object, the electrical characteristics of the semiconductor laser provide an indication of the distance to the target object. Also, a change in the electrical characteristics can be used to determine an amount of displacement of a target object. A system embodying the invention could also include an optical detector array which can be focused on a target object by monitoring electrical characteristics of one or more semiconductor lasers. A plurality of semiconductor lasers could be arranged in a two dimensional or a three dimensional array such that the semiconductor lasers are located at different distances from a target surface. By monitoring the electrical characteristics of the plurality of semiconductor lasers, one can determine both an amount and a direction of a displacement of a target object relative to the semiconductor laser array.

51 Claims, 8 Drawing Sheets

SEMICONDUCTOR LASER BASED SENSING DEVICE

This invention was developed with support from National Science Foundation Grant No. EEC9015128, and with support from National Institutes of Health Grant No. 2 R42 CA68829-02. The United States government may have certain rights in this invention.

BACKGROUND OF THE INVENTION

1. Field of the Invention

The invention is related to semiconductor laser based devices for sensing a distance, a displacement, or an image or characteristics of a sample material.

2. Background of the Related Art

Distance and displacement sensing devices that utilize a laser have been known for many years. Typically, the device will output a laser beam that strikes a target object and is reflected from the target object. The reflected laser beam is sensed by a detector, and characteristics of the reflected laser beam are used to determine a distance to the target object, or a displacement of the target object when the object moves.

One such device for determining a distance to a target object is shown in U.S. Pat. No. 5,020,901 to deGroot, the contents of which are hereby incorporated by reference. In the deGroot system, a laser diode emits an amplitude modulated laser beam that is reflected from a target object. The reflected laser beam is sensed by a detector. A signal from the detector provides a measure of the amplitude modulation characteristics of the reflected laser beam, which in turn, is indicative of a position (or change in position) of the target object.

A device for determining a displacement of a target object is shown in U.S. Pat. No. 5,619,318 to Yamomoto et al., the contents of which are hereby incorporated by reference. In one embodiment, the Yamomoto system includes a vertical cavity surface emitting laser that generates a laser beam that is directed toward a target object, and a photodetector located adjacent to the path of the laser beam on the target object. The detector senses characteristics of the laser beam output by the laser. In another embodiment, the detector is located adjacent the laser. In this embodiment, the detector senses characteristics of the laser light output by the laser and reflected from the target object. Characteristics of the sensed laser light are used to determine a displacement of the target object.

The use of vertical cavity surface emitting lasers has become more common in recent years as semiconductor fabrication techniques have become more sophisticated and less expensive. Also, several different structures have been created which combine both a vertical cavity surface emitting laser and a detector on a single substrate. Such laser emitter and detector pairs are described in U.S. Pat. No. 5,285,466 to Tabatabaie, U.S. Pat. No. 5,648,979 to Mun et al., and U.S. Pat. No. 5,491,712 to Lin et al. The contents of all three of these patents are hereby incorporated by reference.

All of these prior art devices require the use of both a laser emitter and a separate detector to determine a distance to a target object or a displacement of a target object.

Two types of known confocal microscope systems are shown in FIGS. 1A and 1B. A confocal microscope system is used to obtain an image or to determine characteristics of a very small portion of a sample material. The device is typically provided with means for scanning an interrogating light beam, or with means for moving the sample material relative to the sensing device, so that the image or characteristics of many different small portions of the sample material can be obtained. This information can then be combined to create an entire image of the sample material, or a map of the sample material's characteristics.

In the confocal system shown in FIG. 1A, a light source 10 outputs light, most of which is blocked by a shutter 12. A small portion of the light passes through a small aperture 11 in the shutter. This essentially creates a point source of light.

The light passing through the aperture 11 is then focused onto a sample material 15 by a focusing lens 14. The focusing lens is controlled to focus the light onto a specific point on the sample material. In the system shown in FIG. 1A, the focusing lens 14 focuses the light onto an interrogated point 13 in a focal plane 16 within the sample material 15. The light passes through the interrogated point and on to a second focusing lens 17. The second focusing lens focuses the light through an aperture in a second shutter 18. Any light passing through the aperture in the second shutter 18 then impinges on a detector 19, which creates an output signal.

The second focusing lens 17 is arranged so that only light passing through the interrogated point will pass through the aperture in the second shutter 18. Thus, any stray light from structures above and below the interrogated point are filtered out. This type of confocal system is able to determine characteristics of an extremely small interrogated point in a sample material.

The sample material can then be moved to interrogate other points in the material, or the interrogating light beam can be scanned across the material to interrogate other points. The most common system is laser scanning, where two or more mirrors are used to sweep the interrogating light beam across the sample material. The intensity of the light beam impinging on the detector is recorded for each point on the sample material, and a complete set of recorded intensities can be used to create an image of the interrogated portions of the sample material. Such a system can be used to determine the characteristics of multiple planes within a three dimensional sample material. Thus, a stack of planar images, or a stack of planar characteristic maps can be obtained.

In the confocal system shown in FIG. 1A, light transmitted through the sample material is used to obtain an image or to determine sample characteristics. The confocal system shown in FIG. 1B uses light reflected from interrogated points in the sample material.

In the system shown in FIG. 1B, light is produced by a light source 10, and the light passes through an aperture 11 in a shutter 12. The light is columnated by a first focusing lens 14a, and the columnated light passes through a beam splitting element 14b. The light then passes through a second focusing lens 14C, which focuses the light on an interrogated point 13 in a focal plane 16 within a sample material 15. Light reflected from the interrogated point 13 passes back through the second focusing lens 14c and on to the beam splitting element, which sends at least a portion of the reflected light toward a third focusing lens 17. The reflected light passing through the third focusing lens 17 is focused through an aperture in a second shutter 18 onto a detector 19.

A device as shown in FIG. 1B can also be used to obtain an image or to determine characteristics of small points within the sample material. This type of confocal system can also include some means for moving the interrogating light beam over different portions of the sample material.

SUMMARY OF THE INVENTION

The invention is a device and method for utilizing semiconductor lasers to determine a distance to a target object, to determine a displacement of a target object, to obtain images of a target object, to determine a displacement of a target object. In devices and methods embodying the invention, a semiconductor laser acts as both a light source and as a detector. Electrical characteristics of the semiconductor laser itself are monitored to provide information about the target object. By eliminating the need for a separate detector, the device can be made more simple and less expensive. Preferred embodiments of the invention utilize a vertical cavity surface emitting laser or an edge emitting laser as the laser emitter.

A device embodying the invention, which is capable of detecting a distance to a target object or a displacement of a target object, can include optical imaging devices. For instance, a device embodying the invention could include a laser system for determining a distance to a target object, and a charge coupled device (CCD) optical detector array for imaging the target object. A signal output by the distance determining device could be used to focus the optical detector array on the target object.

In still other embodiments of the invention, a plurality of semiconductor lasers can be arranged in a one dimensional, two dimensional or three dimensional array configured such that different ones of the semiconductor lasers are positioned at different distances from the target object. By monitoring the electrical characteristics of two or more of the semiconductor lasers in the array, one can determine an amount and/or a direction of a displacement of a target object relative to the laser emitter array.

Other embodiments of the invention could utilize a single semiconductor laser, or a plurality of semiconductor lasers arranged in an array, to directly obtain an image of a target material, or to determine characteristics of a target material, without the use of a separate imaging device. These embodiments could be arranged in a fashion similar to existing reflective type confocal microscope systems, however, in embodiments of the invention, the semiconductor lasers would act as both the light emitter and the detector. This would simplify the system relative to existing confocal systems that require separate detectors. Also, because the dimensions of the semiconductor laser can be made extremely small, the semiconductor laser would inherently acts as a point source of light. Thus, a confocal-type embodiments of the invention would also not need separate shutters or apertures to omit stray light, which further simplifies the system relative to existing confocal systems.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

A description of preferred embodiments of the invention will be provided in conjunction with the following drawing figures, wherein like reference numbers refer to like elements, and wherein.

DETAILED DESCRIPTION OF PREFERRED EMBODIMENTS

Figure 2:
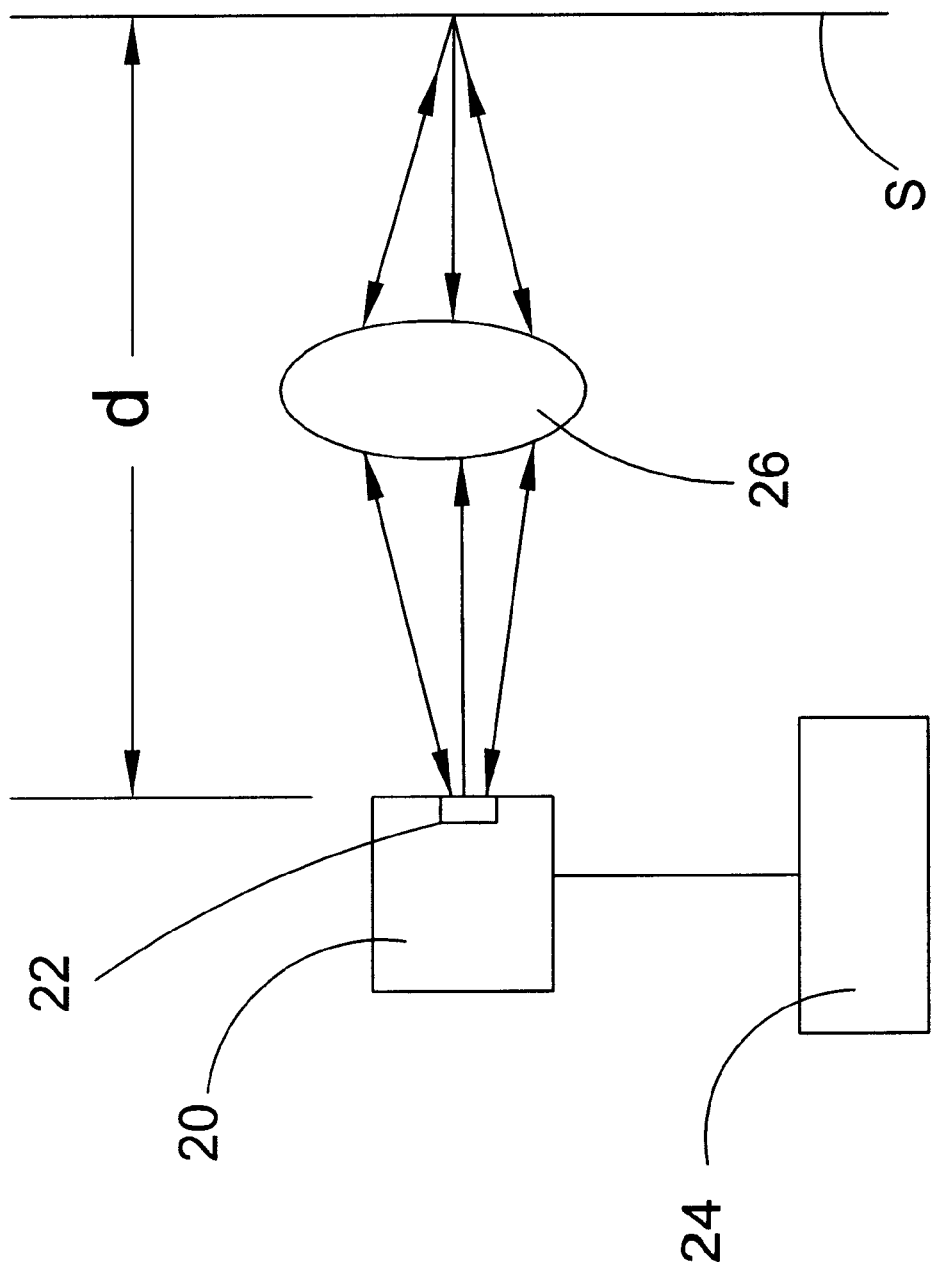
FIG. 2 is a diagram of a laser distance or displacement sensing system embodying the invention.

A relatively simple system embodying the invention is shown in FIG. 2. In this system, a vertical cavity surface emitting laser (VCSEL) 22 on a substrate 20 is positioned adjacent a surface S of a target object. The VCSEL is separated from the surface S by a separation distance d. A laser light beam emitted by the VCSEL 22 is directed to an optical focusing lens 26 positioned between the VCSEL 22 and the surface S. The focusing lens 26 focuses the laser beam from the VCSEL 22 onto a focal point on the surface S. Of course, additional focusing lenses or reflective elements could be used to focus the laser beam from the VCSEL 22 onto the surface S.

Laser light impinging on the surface S will be reflected back through the lens 26 and onto the VCSEL 22. When the separation distance d is such that the surface S is in the focal plane of the optical system that includes the VCSEL 22 and the focusing lens 26, the amount of light reflected from the surface S back into the VCSEL is maximized. If the separation distance d is such that the surface S is not in the focal plane, some lesser amount of light will be reflected back into the VCSEL 22.

In a VCSEL, an electric current causes the laser beam emission. If photons that are emitted by the VCSEL are reflected back into the device, the excess photons are absorbed. This reduces the internal resistance of the device and results in a higher current flow, which in turn results in an increase in the optical power output. The greater the amount of light reflected back into a VCSEL, the greater the current in the device. As the magnitude of the light reflected back into a VCSEL changes, the magnitude of the current in the device will vary.

A device and method embodying the invention exploits this feedback effect to determine when a target surface is within a focal plane of the optical system shown in FIG. 2. A sensor 24 connected to the VCSEL 22 senses the current within the VCSEL 22. This can be done by directly sensing the current, by sensing a voltage drop across the VCSEL 22, or by sensing a voltage drop across a separate circuit in the sensor 24 that is connected to the VCSEL 22. When the separation distance d is such that the surface S is positioned in the focal plane of the system, the current or voltage sensed by the sensing device 24 will be at a maximum.

Figure 3:
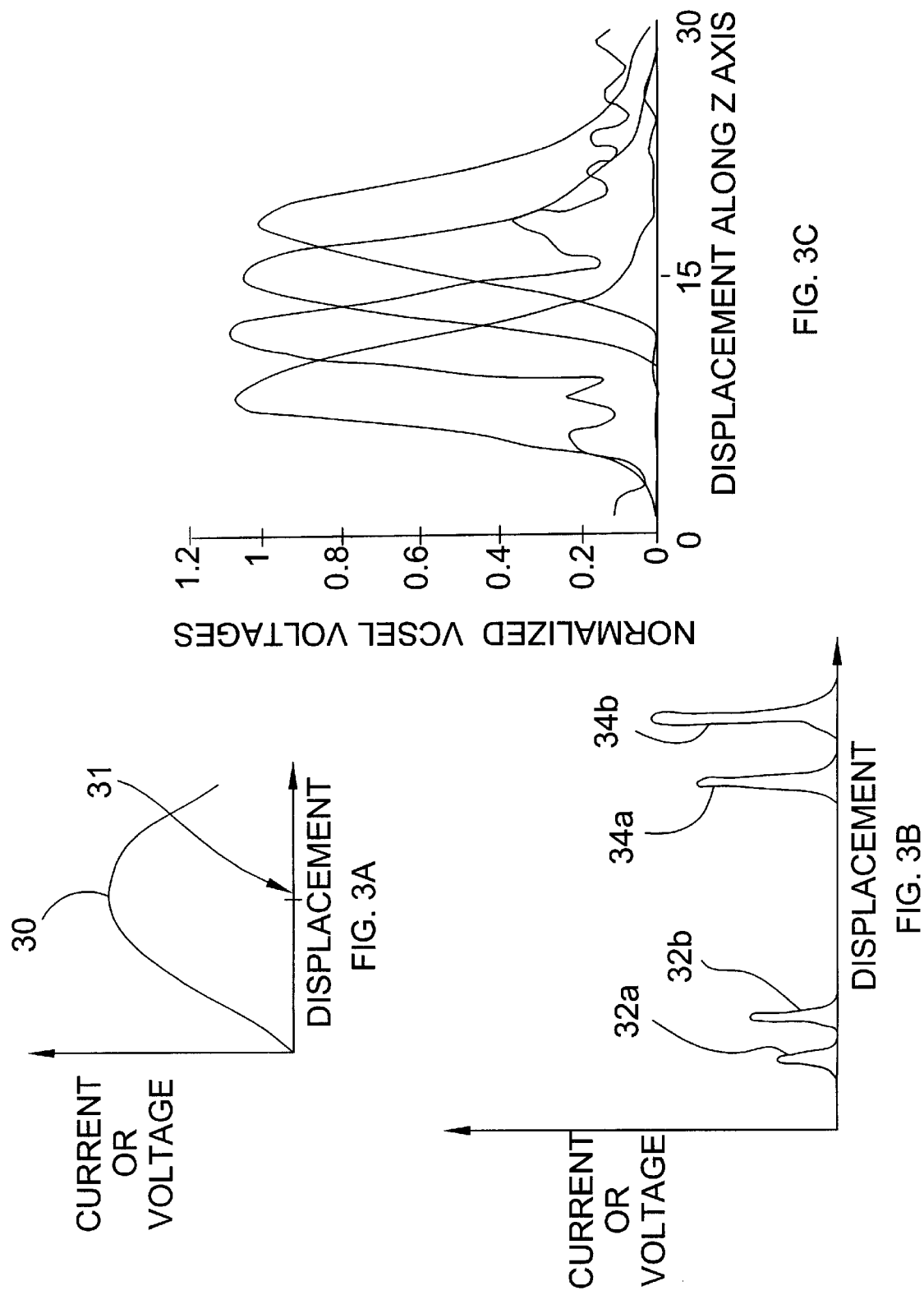
FIG. 3A is a diagram of electrical characteristics of a semiconductor laser of a device embodying the invention for different displacements relative to a target object.
FIG. 3B is a diagram of electrical characteristics of a semiconductor laser of a device embodying the invention for different displacements relative to a multi-surface target object.
FIG. 3C is a diagram of electrical characteristics of a four laser sensor array for different displacements relative to a surface of a target object.

FIG. 3A shows a diagram of electrical characteristics of a VCSEL as a surface S was moved away from the VCSEL. The curve 30 indicates that when the surface S was located between the VCSEL 22 and the focal plane of the system, the voltage or current was relatively low. As the surface S moves towards the focal plane, greater amounts of light are reflected from the surface S back into the VCSEL, and the current or voltage gradually increases. The current or voltage reaches a maximum when surface S is located at the focal plane of the system, at the displacement 31. As the surface S continues to move away from the VCSEL, the current or voltage gradually decreases.

By sensing the current or voltage of a VCSEL as a target surface moves toward or away from the VCSEL, and noting the displacement distances, one can obtain a calibration curve, the VCSEL profile, like the one shown in FIG. 3A. This allows one to determine a displacement distance to a target object surface based on the sensed current or voltage.

FIG. 3B shows a curve of the current or voltage of a VCSEL as the VCSEL was moved toward a two-part transparent target object. The target object in this instance was two microscope cover slips. As the VCSEL moved toward the two cover slips, the focal plane of the laser light beam generated by the VCSEL passed through the front and rear surfaces of the first cover slip, then the front and rear surfaces of the underlying cover slip. The peak 34b corresponds to the front side of the first cover slip, while the peak 34a represents the back side of the first cover slip. The peak 32b corresponds to the front side of the underlying cover slip, and the peak 32a corresponds to the back side of the underlying cover slip. The distance between the peaks 32b and 34a represents the air gap between the top cover slip and the underlying cover slip.

The sensitivity of a system like the one shown in FIG. 2 can be improved by adding a reflective coating such as aluminum, or a wavelength specific coating, such as a dielectric coating, to the surface of the target object. The reflective coating increases the amount of light generated by the VCSEL that is reflected back to the VCSEL.

By sensing the electrical characteristics of a VCSEL one can determine a distance to a target object, a displacement of a target object, or a distance between target surfaces of multi-surface target objects. Using the system shown in FIG. 2 as an example, one could hold the VCSEL 22 and the focusing lens fixed, and slowly move the surface S towards and away from the VCSEL 22. By monitoring the current or voltage in the VCSEL as the surface S moves, one can determine how the electrical characteristics of the VCSEL change for different separation distances d. After the system has been calibrated, one can simply monitor the current or voltage in the VCSEL 22 using the detector 24, and the sensed current or voltage could be converted to the actual separation distance.

In alternate embodiments of the system shown in FIG. 2, the VCSEL 22 may be movable with respect to the surface S. One could determine a separation distance as described above. To determine an amount of displacement of the surface S, one could first move the VCSEL 22 until the voltage or current of the VCSEL is maximized. Then, when the surface S is displaced, one could move the VCSEL 22 towards or away from the new position of the surface S until the current or voltage in the VCSEL 22 is again maximized. By noting the amount of displacement required to again maximize the current or voltage in the VCSEL 22, one could determine the amount of displacement of the surface S.

In still other embodiments of the invention, the system could be constructed such that the focusing lens 26 is movable. One could then maximize the current or voltage in the VCSEL 22 by moving the focusing lens 26 to the appropriate position such that the surface S is in the focal plane. Then, if the surface S is displaced, one could move the focal lens 26 until the surface is again positioned in the focal plane of the system, thus again maximizing the current or voltage in the VCSEL 22. The amount of movement or displacement of the focal lens 26 required to focus the displaced surface back into the focal plane of the system could be converted to a displacement of and/or a distance to the surface S.

The "working distance" of a VCSEL based system is the range or displacement, along the Z axis, through which the VCSEL voltage is large enough to provide useful and accurate measurement results. During experimentation, the inventors found that the best results were obtained when the voltage was greater than approximately 70% of its peak value. Other voltage ranges might be possible so long as the change in voltage is sufficient to provide an accurate measurement result. For a single VCSEL device integrated into an optical system having an effective numerical aperture of 0.6, the working distance was found to be approximately three microns.

The working distance of a VCSEL based sensing device can be increased by adding additional VCSEL sensors. In an essentially one dimensional tracking system, a two dimensional array can be created by arranging multiple VCSEL sensors substantially in a line (one dimension), but with the VCSELs arranged in a staggered fashion. Thus the VCSEL array actually extends in two dimensions. In a two dimensional tracking scenario, a three dimensional array of VCSELs can be used, where VCSELs arranged in a two dimensional array are also staggered in a third dimension.

FIG. 3C shows normalized VCSEL voltages for a four VCSEL array. As shown in FIG. 3C, at least one VCSEL will output at least 70% of its peak voltage across a displacement range of approximately 15 microns. Thus, the four VCSEL array has a much greater working distance than a single VCSEL device.

Figure 4:
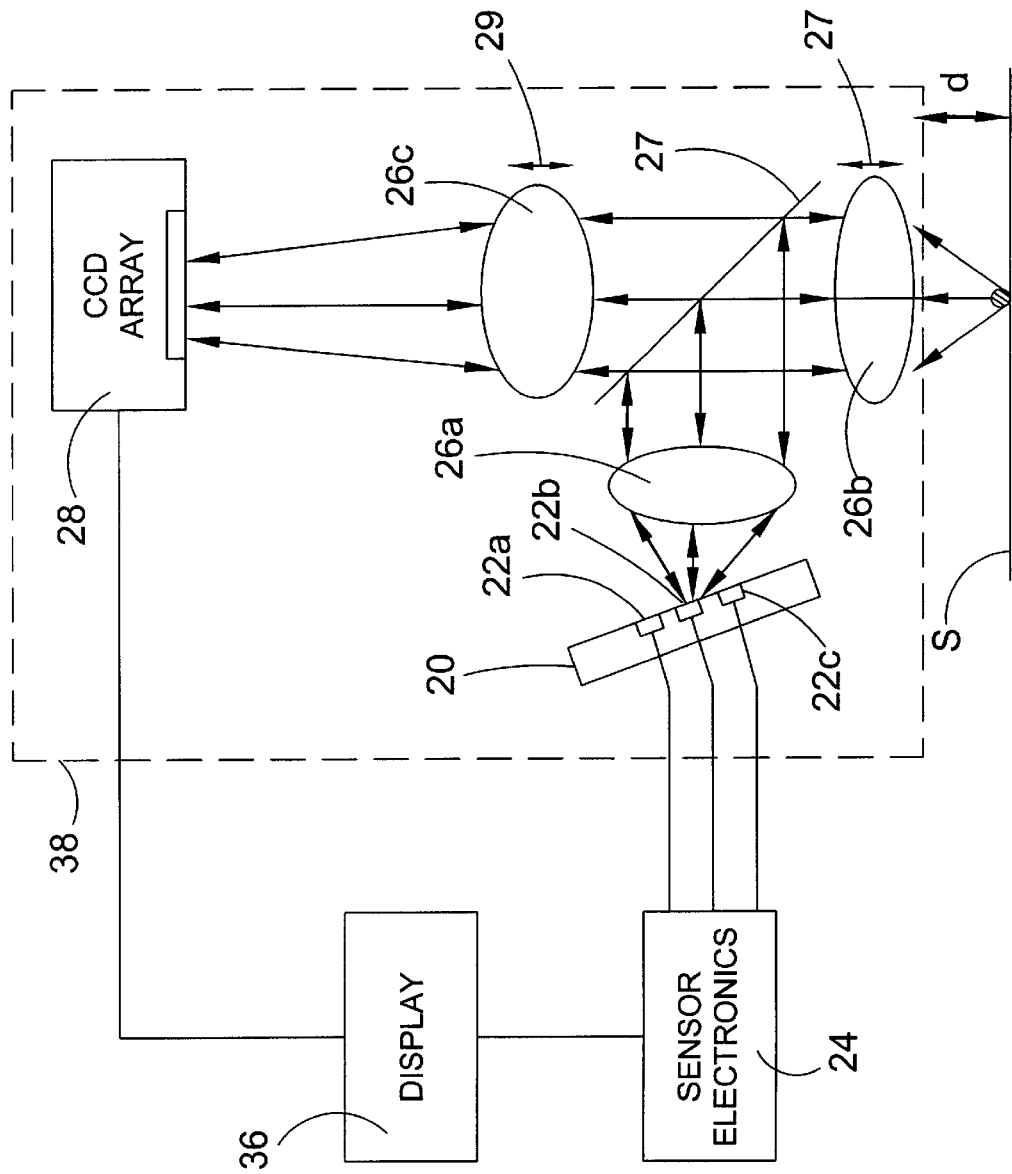
FIG. 4 is a diagram of a system embodying the invention that includes a two dimensional array of semiconductor lasers and an optical detector array for imaging a target object.

Another embodiment of the present invention that uses an array of semiconductor lasers is shown in FIG. 4. In this system, three VCSELs 22a, 22b and 22c are formed on a substrate 20. The substrate 20 is positioned such that the VCSELs are located different distances from the surface S. Laser beams generated by the VCSELs 22a, 22b, 22c are focused onto the surface S by a first focal lens 26a, a dichroic mirror 27 and second focusing lens 26b. Electrical characteristics of each of the VCSELs 22a, 22b, 22c are monitored by sensor electronics 24. Of course, additional different optical elements could be used in place of the lenses 26a, 26b and the dichroic mirror 27.

A system having an array of VCSELs that are positioned at different distances from a target surface S can be used to determine an amount and/or a direction of a displacement of the target surface S. For instance, a separation distance d between the surface S and an assembly 38 containing the VCSEL array could be varied until a current or voltage of the center VCSEL 22b is maximized. This would mean that the first VCSEL 22a would output a laser beam that is not focused on the surface S because it is too far away. This would also mean that the third VCSEL 22c would not be focused on the surface S because it is too close to the surface S. When the surface S is displaced relative to the VCSEL array, the current or voltage in either the first or the third VCSEL will increase, and the voltage or current in the other of the first or third VCSELs will decrease. This will occur because a displacement of the surface S will move it farther away from the focal plane of one of the outer VCSELs, and closer to the focal plane of the other of the outer VCSELs. Thus, by monitoring the electrical characteristics of all three of the VCSELs, one could determine the direction of the displacement of the surface S. Also, by calibrating one or more of the VCSELs of such a device so that the amount of a change in the electrical characteristics of a VCSEL can be converted to a displacement amount, one could determine the amount of displacement.

In alternate embodiments, one or two VCSELs could be used in place of the three VCSELs shown in FIG. 4.

In a one VCSEL embodiment, the surface S and the VCSEL would be positioned such that the surface S is located on the slope of the VCSEL profile. Then, any displacement of the surface will cause the surface to move either closer to the focal plane of the VCSEL, or further away from the focal plane of the VCSEL. The electrical characteristics of the VCSEL would indicate the direction of displacement of the surface.

In a two VCSEL embodiment, the surface S and the two VCSEL array would be positioned such that the surface S is located between the focal planes of the two VCSELs. Then, any displacement of the surface will cause the surface to move closer to the focal plane of one VCSEL, and further away from the focal plane of the other VCSEL. The electrical characteristics of the two VCSELs would thus indicate the direction of displacement of the surface S. These principles can be further extended to multiple VCSEL arrays arranged in one, two and three dimensional arrays.

The device shown in FIG. 4 may also include an optical detector array for generating an image of the surface S. In the embodiment shown in FIG. 4, a charge coupled device (CCD) 28, or a CMOS sensor, comprising an array of optical detector elements is positioned over the surface S. Light from the surface S passes through the second focusing lens 26b, the dichroic mirror 27, and a third focusing lens 26c and is focused on the CCD 28. The CCD 28 could produce a display signal which can be output to a display 36 which displays an image of the surface S. Also, in an embodiment like the one shown in FIG. 4, the sensor electronics 24 might also produce a display signal for displaying information about a distance to the surface, or a displacement of the surface S. For instance, the sensor electronics 24 could determine a distance to the surface S and output a display signal so that the display 36 will indicate the distance to the surface S. The sensor electronics 24 could also calculate an amount of a displacement of the surface S and output a display signal indicative of the displacement.

In the embodiment shown in FIG. 4, the optical focusing elements could be movable in the direction of the arrows 27, 29 to focus light from the surface onto the CCD array 28. The focusing lenses could also be moved as part of a process of determining a distance to the surface S or a displacement of the surface S, as described above.

Figure 5A:
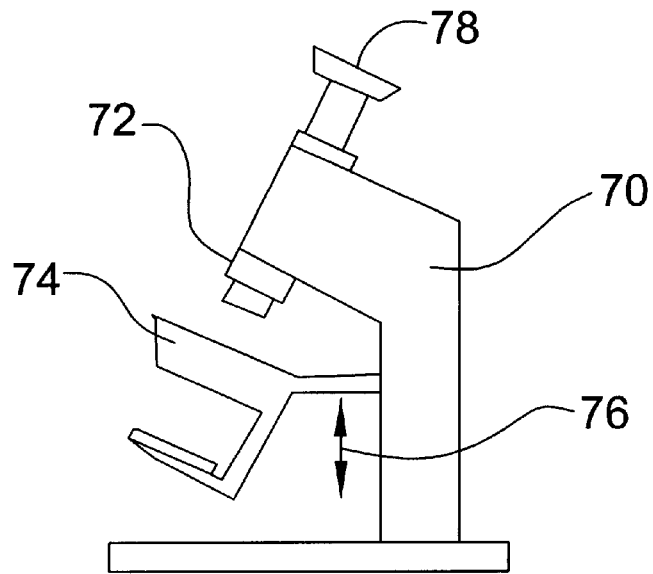
FIG. 5A is a diagram of a microscope that incorporates a distance determining device embodying the invention.
Figure 5B:
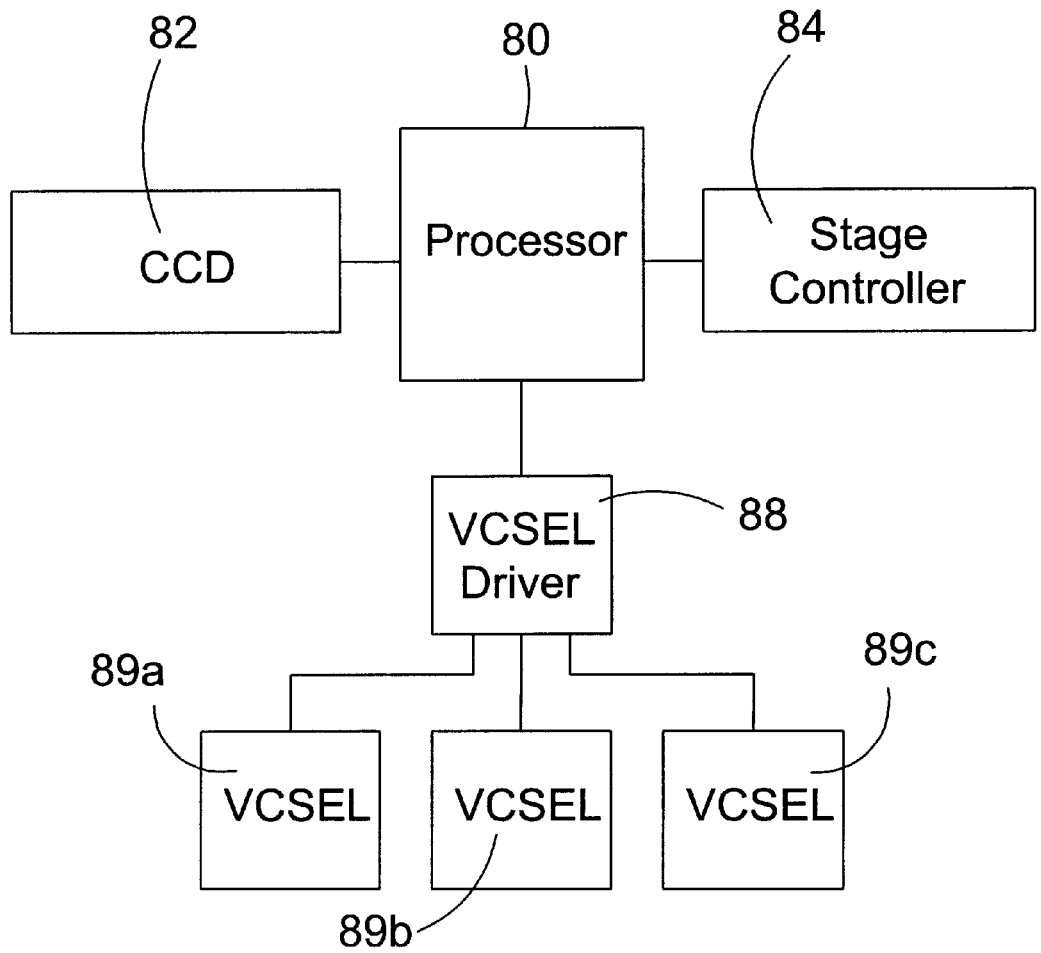
FIG. 5B is a block diagram of a control system incorporated into the microscope shown in FIG. 5A.

An example of an application of a distance determining device embodying the invention is shown in FIGS. 5A and 5B. FIG. 5A shows a microscope 70 having a movable stage 74 for holding a microscope slide. The stage 74 can move upward or downward in the directions of arrows 76 to properly focus the viewing optics 78, 72 on a slide. The viewing optics could also incorporate a CCD imaging device for capturing an image of the slide.

FIG. 5B shows a control system embodying the invention that could be incorporated into the microscope shown in FIG. 5A. The system includes a processor 80 connected to a stage controller 84, which controls movement of the microscope stage. The system also includes three VCSELs 89a, 89b and 89c, which are connected to a VCSEL driver 88. The VCSEL driver 88 is, in turn, connected to the processor.

The VCSELs can be arranged in a manner similar to that described above for the device shown in FIG. 4. The VCSELs would be used to determine the location of the stage relative to the viewing optics 72, 78 or a CCD imaging device. Information generated by the VCSELs could then be used to control the position of the movable stage 74 until the slide mounted on the stage 74 is in focus for a human or for the CCD array.

Figure 6:
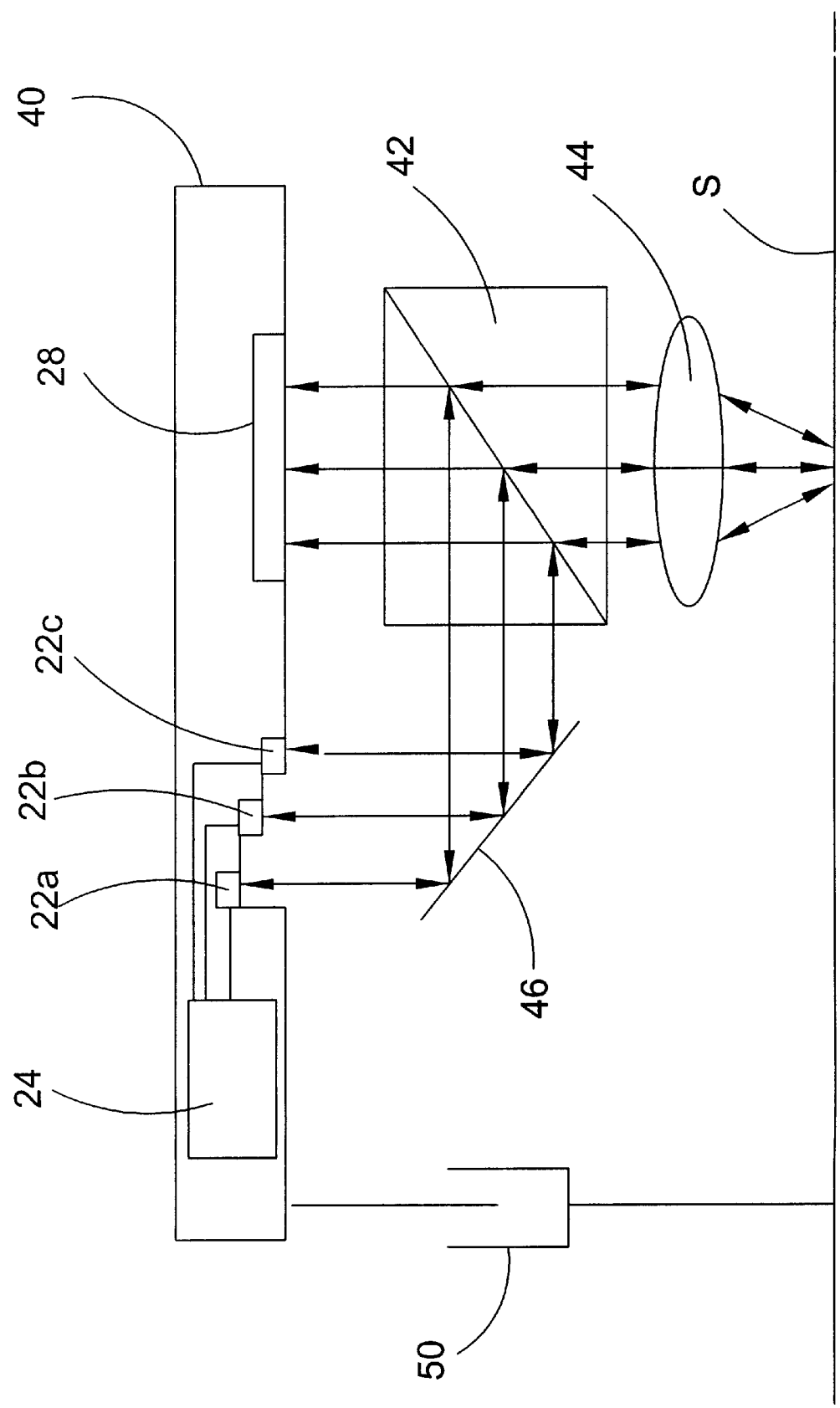
FIG. 6 is a diagram of a system embodying the invention that includes both an array of semiconductor lasers and an array of optical detectors integrated on a single semiconductor substrate.

FIG. 6 shows another embodiment of the invention in which an optical detector array 28 and an array of semiconductor lasers 22a, 22b, 22c, along with detector electronics 24 are all formed on a single substrate 40. In other words, a CCD, a VCSEL array, and sensor electronics could all be formed on a single semiconductor chip. In this embodiment, a focusing lens 44 and a dichroic element 42 are used to focus light from a target surface S onto the optical detector array 28. The focusing lens 44, dichroic element 42 and a reflecting mirror 46 can also be used to focus light from the VCSEL array 22a, 22b, 22c onto the target surface, and to focus light reflected from the surface S back into the VCSEL array. This embodiment would operate substantially as described above for the embodiment shown in FIG. 4.

A device like the one shown in FIG. 6 could also include a displacement device 50 for displacing the substrate 40 containing the optical detector array 28 and the VCSEL array relative to the surface S. This could be used to initially calibrate the device to determine how the electrical characteristics of the VCSELs 22a, 22b and 22c correspond to different separation distances from the surface S. The displacement device 50 could also be used to move the substrate 40 or the surface S so that the optical detector array 28 is properly focused on the surface S.

If a displacement device 50 like the one shown in FIG. 6 is provided, a signal from the detector electronics 24 could be used to keep the optical detector array 28 focused on the surface S as the surface moves. Any displacement of the surface S in the vertical direction could be compensated for by a displacement of the substrate 40 caused by the displacement device 50 under the control of the detector electronics 24.

If a displacement device 50 is provided, as shown in FIG. 6, the substrate 40 could be scanned across a two dimensional surface S to selectively image different portions of the surface S. A signal from the detector electronics 24 could be used to keep the optical detector array 28 properly focused on the surface S as it scans across the surface S.

The semiconductor laser sensors shown in FIGS. 4 and 6 could be a single VCSEL sensor, or one dimensional, two dimensional or three dimensional VCSEL arrays. In a one dimensional array, two or more semiconductor lasers would be arranged in a first direction, and the array would be positioned such that the lasers are located at different distances from a target surface S, as shown in FIGS. 4 and 6. In a two dimensional array, multiple VCSELs are arranged in two directions. In a three dimensional array, like the one shown in FIG. 7, a plurality of semiconductor lasers would be arranged in a two dimensional array, and different ones of the semiconductor lasers would be located at different distances from a target surface S.

Figure 7:
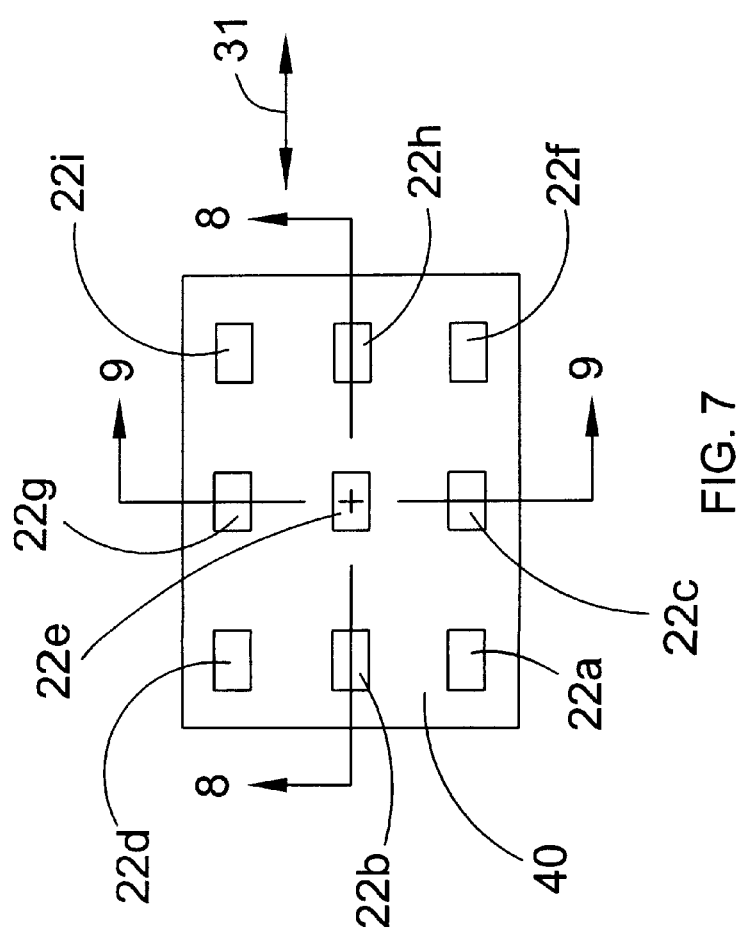
FIG. 7 is a plan view of a three dimensional array of semiconductor lasers embodying the invention.

As shown in FIG. 7, nine semiconductor lasers 22a–22i, such as VCSELs, are located in a rectangular array on a substrate 40. A first VCSEL 22a is located higher up in the substrate than all the remaining VCSELs. The ninth VCSEL 22i is located lower in the substrate than all the remaining VCSELs. The second-eighth VCSELs 22b–22h are all located at heights between the first VCSEL 22a and the ninth VCSEL 22i. In one embodiment, the second and third VCSELs 22b and 22c are located at substantially the same height in the substrate, the fourth, fifth and sixth VCSELs 22d, 22e and 22f are all located at the same height, and the seventh and eighth VCSELs 22g and 22h are located at the same height.

Figure 8:
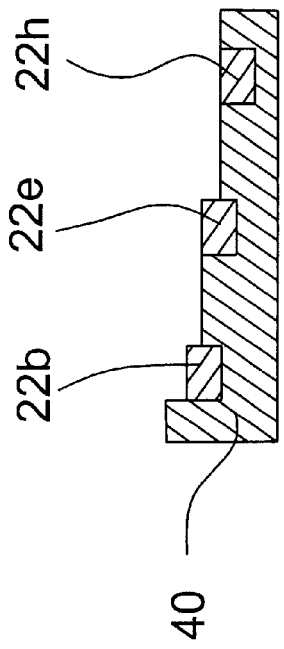
FIG. 8 is a cross-sectional diagram of the three dimensional semiconductor laser array of FIG. 7 taken along section line 8—8.

As shown in FIG. 8, the second VCSEL 22b, the fifth VCSEL 22e and the seventh VCSEL 22h are all located at different heights. Similarly, as shown in the sectional view of FIG. 9, the third VCSEL 22c, the fifth VCSEL 22e and the seventh VCSEL 22g are all located at different heights. In other embodiments, all the VCSELs 22a–22i could be located at different heights.

Figure 9:
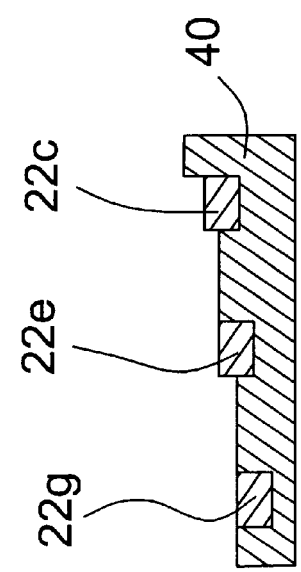
FIG. 9 is a cross-sectional diagram of the three dimensional semiconductor laser array of FIG. 7 taken along section line 9—9.

When a three dimensional VCSEL array, such as the one shown in FIGS. 7–9, is used in a system embodying the invention, electrical characteristics of all the VCSELs can be monitored to determine the amount and direction of a displacement of a target surface relative to the VCSEL array. Because a plurality of VCSELs are located in a two dimensional array, and different ones of the VCSELs are also located at different distances from a target surface, the electrical characteristics of the VCSELs will tell precisely how a distance to the target surface varies.

In each of the embodiments described above, one or more VCSELs could be focused onto a target surface, or an optical detector array such as a CCD or a smart pixel array (SPA) could be focused on the target surface, by moving the target surface, the optical detector array/VCSEL array, or by moving one or more focusing elements in the system. Also, the optical focusing elements such as focusing lenses, dichroic mirrors and reflecting mirrors which are shown in the embodiments described above are not the only possible configurations. Any configuration of focusing lenses, mirrors and beam splitting elements could be used to focus laser beams generated by a semiconductor laser on a target surface, or to focus light from a target surface on an optical detector array.

In still other embodiments, a three dimensional VCSEL array as shown in FIG. 7 could have the VCSELs arranged in three rows, where all of the VCSELs in a particular row are arranged at the same height. For instance, the VCSELs 22a, 22b and 22d could be located at a first height, the VCSELs 22c, 22e and 22g could be located at another height, and the VCSELs 22f, 22h and 22i could be located at a third height.

This type of a VCSEL array could be scanned across a target surface in the directions of arrows 31. By scanning the detector array across the target surface in these directions, three VCSELs at different heights will each pass across the same locations on the target surface. By noting the electrical characteristics of the VCSELs as the array moves across the target surface, one could create a profile of the surface. Larger detector arrays having greater numbers of VCSELs could cover greater amounts of a target surface simultaneously, and could provide better resolution of the profile of the target surface.

Although it would be possible to use a semiconductor laser based sensing system embodying the invention in a wide variety of different contexts, a few specific examples are discussed below. The description of examples is in no way intended to limit the invention. One of skill in the art could adapt a semiconductor laser based sensor system embodying the invention to many different devices not described in the present application. Also, although many of the examples given in the present application utilize VCSELs, any type of semiconductor laser could be used in place of the VCSELs with appropriate modifications.

One use of a VCSEL based sensor embodying the invention is for use with an autofocusing system of a microscope. In such a system, an image processing algorithm could be used to determine the quality of focus of an image taken by a CCD imager of a microscope. For example, Brenner's Algorithm could be used to determine the quality of focus. The system would also include a VCSEL based sensor embodying the invention, like the ones described above, which outputs a voltage or current of one or more VCSELs that is indicative of a separation distance.

The system would initially record a series of images of a microscope slide, using the CCD imager, for various separation distances between the microscope optics and the microscope slide. The voltage(s) or current(s) of one or more VCSELs of the VCSEL sensor would also be recorded for each image. The image processing algorithm would then be used to determine which image had the best quality of focus. The VCSEL voltage/current corresponding to the image having the best quality of focus would then be selected as an optimum voltage/current, which is representative of the optimum separation distance between the focusing optics and the microscope slide. As the microscope is adjusted to image different portions of the microscope slide, the stage of the microscope could then be automatically moved until the VCSEL outputs the optimum voltage/current. Thus, the microscope would be automatically adjusted to provide the best possible focus based on the VCSEL output.

In alternate embodiments of a microscope autofocus system embodying the invention, the process of recording a series of images at different displacement distances, and the corresponding VCSEL voltages/currents, could be repeated each time the focusing optics is moved to a new position on the microscope slide. The image processing algorithm would then be used to determine the image having the best quality of focus for the new position, and corresponding VCSEL voltage/current for the most focused image would be selected as the new optimum voltage/current. The microscope stage would then be automatically adjusted to the displacement distance that causes the VCSEL to output the new optimum voltage/current, thus providing the best quality of focus for the new position. Provided the process of capturing a series of images and performing the image analysis can be accomplished relatively quickly, this version of the autofocus system could ensure that the microscope is always arranged for optimum focus.

A VCSEL sensor embodying the invention can be used to track extremely small displacements of surfaces. Such sensors could be very useful for photolithography and integrated circuit manufacturing processes, where extremely small movements of photolithographic masks must be accurately sensed. Also, such a VCSEL sensor provides a relatively inexpensive way to accurately measure larger photolithographic mask movements down to the micron or submicron level, which can be very important for mask alignment.

A VCSEL sensor embodying the invention could also be used to track the surface of a machined or manufactured part to determine surface characteristics such as smoothness, reflectivity, porosity, etc. Checking for such surface characteristics could be useful in mechanical part manufacturing and integrated circuit processing.

Furthermore, because a VCSEL sensor embodying the invention can be used to determine the distance between two surfaces of a multi-surface device, such a sensor could be used in liquid crystal device manufacturing to determine the gap between two or more layers of a liquid crystal device.

In each of the systems described above, the lenses used to control and focus light onto the surface of a target object, or onto a VCSEL could be microlens systems. Also, micromirror devices could also be used with VCSEL sensors embodying the invention. In some instances, it could be useful to utilize digital micro-mirror devices DMDs) to selectively focus light beams from a VCSEL onto a surface, or back to a VCSEL. A system embodying the invention could include a single substrate having both VCSELs and DMDs arranged in a desired pattern, or two separate devices, one incorporating DMDs and the other incorporating VCSELs could be used. A single substrate could incorporate one dimensional, two dimensional or three dimensional arrays of VCSELs and DMDs.

Figure 10:
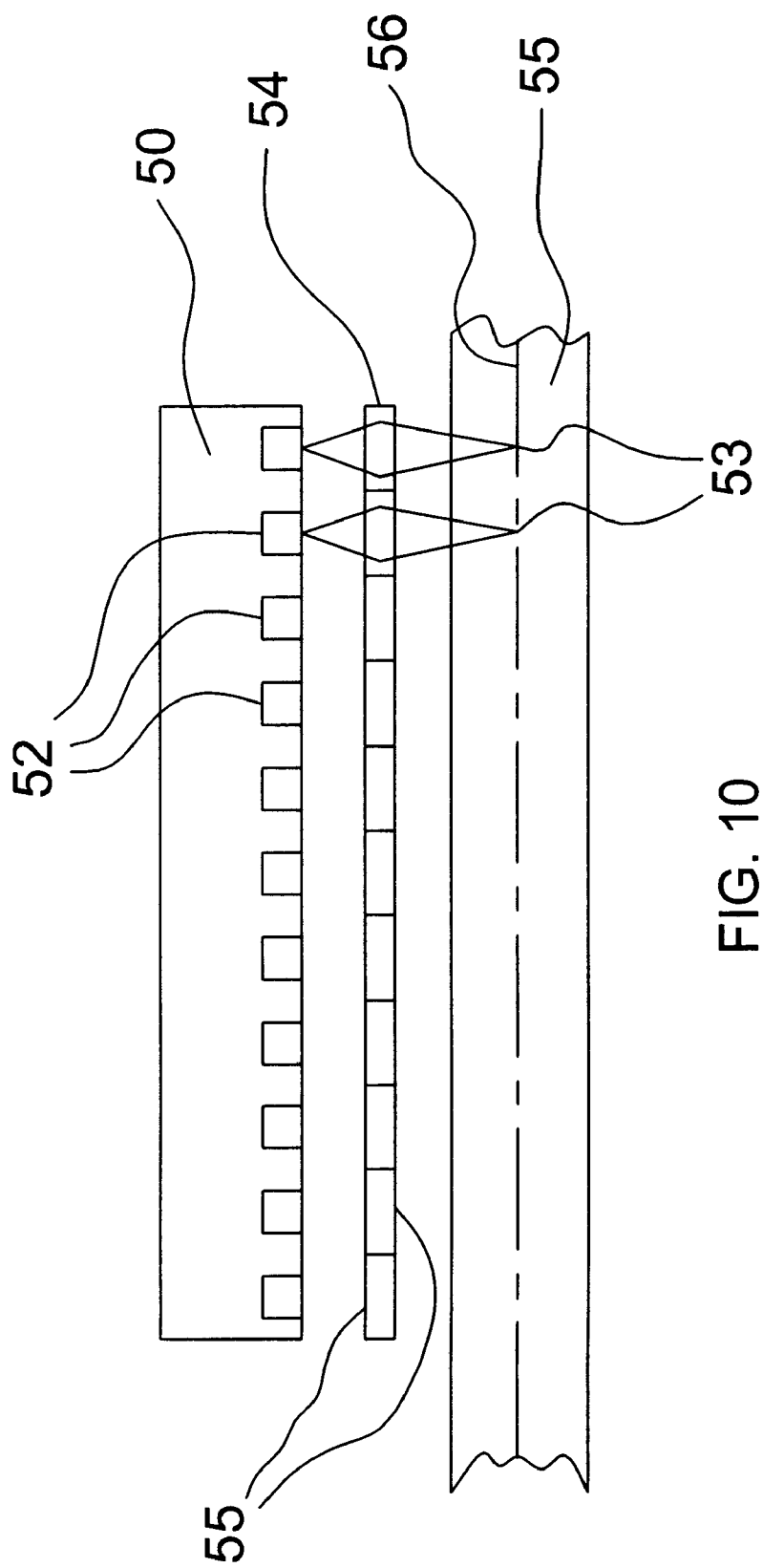
FIG. 10 is a diagram of a device embodying the invention designed to interrogate positions within a sample material.

A device embodying the invention that could replace some existing confocal microscopes is shown in FIG. 10. In this embodiment, a substrate 50 includes a plurality of semiconductor lasers 52. A microlens array 54 is positioned between the semiconductor lasers 52 and a sample material 55. The microlens array 54 includes a plurality of focusing lenses 55 that are designed to focus light from the semiconductor lasers 52 onto selected interrogated points 53 in a focal plane 56 within the sample material 55.

Light from a semiconductor laser 52 would pass through a microlens 55 of the microlens array 54, would impinge on an interrogated point 53 of the sample material 55, and a portion of the incident light would be reflected back toward the semiconductor laser 52. The reflected light would pass back through the microlens 55, which would focus the reflected light back into the semiconductor laser 52. The electrical characteristics of the semiconductor laser can be monitored, as described above, to obtain information about the interrogated point.

Figure 1A:
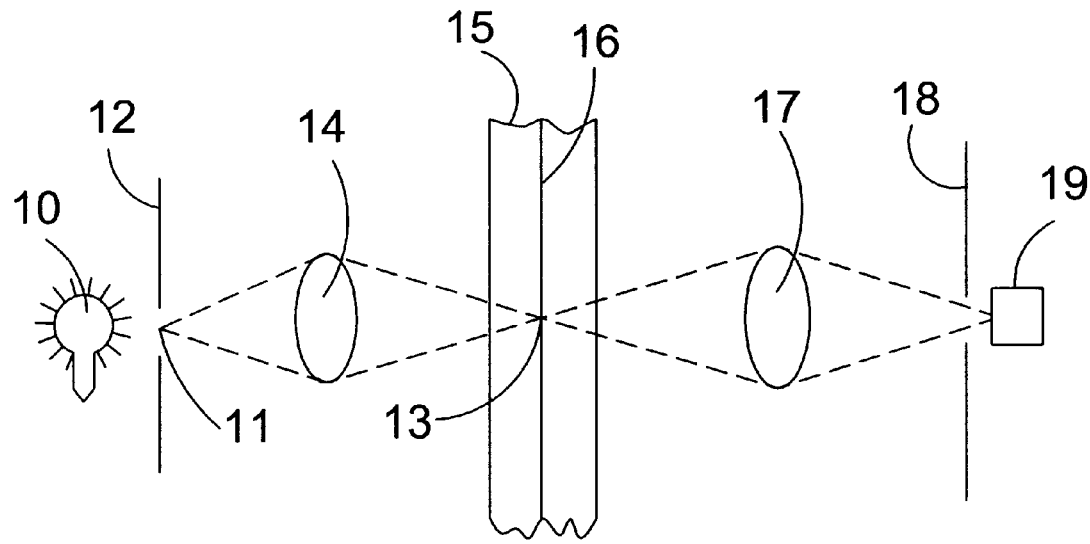
FIG. 1A shows a diagram of a first type of confocal microscope system.
Figure 1B:
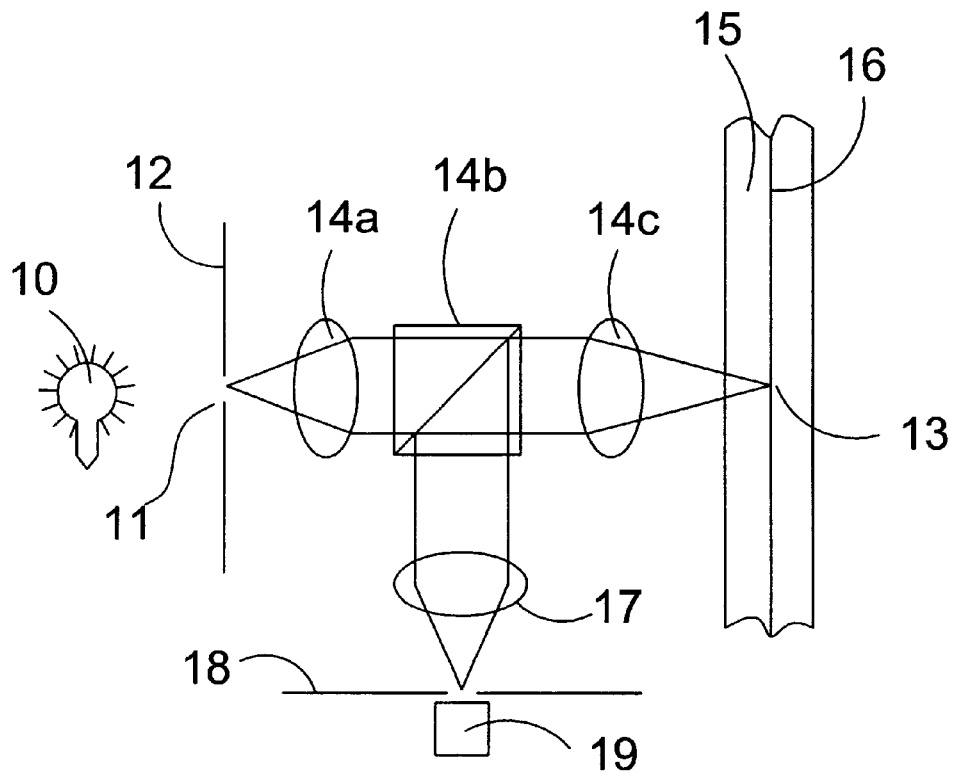
FIG. 1B shows a diagram of a second type of confocal microscope system.

Because the dimensions of the semiconductor lasers can be made extremely small, the semiconductor lasers would effectively act as both point sources of light, and point detectors. Thus, there may be no need for a shutter with apertures, as is used in the confocal systems shown in FIGS. 1A and 1B. If desired, one or more pinhole shutters could also be used to further narrow the light emitted by the semiconductor lasers and reflected back into the semiconductor lasers. This could potentially increase the resolution of the device. Also, because the semiconductor lasers are used as both the light source and the detector, the alignment problems inherent with prior art confocal systems are reduced.

Because multiple semiconductor lasers can be arranged in an array on the substrate, the device can obtain information about multiple interrogated points on the sample material simultaneously. The device could include means for moving the semiconductor lasers relative to the sample material so that information could be gathered for different points on the sample material. Also the device could include means for adjusting the focus of the light beams so that interrogated points at different depths within the sample material can be examined. Further, the device could include means for scanning the light produced by the semiconductor lasers across the sample material to interrogate different portions of the sample material.

Also, although the embodiment shown in FIG. 10 utilizes a microlens array, any other type of optical devices could be used to conduct light from the semiconductor lasers onto selected points in the sample material, and then back to the semiconductor lasers.

A system as shown in FIG. 10 could be used to obtain many different types of information about a sample material, including vibrational characteristics, roughness, surface profile, optical density, feature boundaries, and image characteristics. The device could also be used to examine cellular material and integrated circuits.

If artificial intelligence algorithms are included in the controlling software, the system could also be provided with the ability to learn certain information about a sample material, and to recognize certain patterns. For instance, the device could be trained to recognize abnormal cellular material, or defects in an integrated circuit.

Currently, bar coded labels are usually applied to microscope slides for identification purposes. Unfortunately, the labels can become detached, and a label can be removed from a slide and placed on another slide. This leads to mistakes and problems with identifying the sources of samples on the slides.

When a microscope is equipped with a distance or displacement sensing device for an autofocus system embodying the invention, the system could also be used to "read" etchings in a microscope slide using a process as described immediately above in conjunction with FIG. 10. This would provide a more reliable way of tracking the identification of a sample placed on the slide, since the etchings cannot become detached, and they cannot be switched to a different slide.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A sensing system, comprising:
   at least one semiconductor laser configured to emit a beam of laser light toward a surface; and
   a sensor configured to sense an electrical characteristic of the at least one semiconductor laser, wherein sensed changes in the electrical characteristic of the at least one semiconductor laser correlate to displacements between the at least one semiconductor laser and the surface.

2. The sensing system of claim 1, wherein the at least one semiconductor laser comprises at least one of a vertical cavity surface emitting laser and an edge emitting laser.

3. The sensing system of claim 1, wherein the sensor is configured to sense an electrical current in the at least one semiconductor laser.

4. The sensing system of claim 1, wherein the at least one semiconductor laser operates substantially at its threshold condition.

5. The sensing system of claim 1, wherein the sensor is configured to determine a distance between the at least one semiconductor laser and the surface based on the detected electrical characteristic of the at least one semiconductor laser.

6. The sensing system of claim 1, wherein the sensor is configured to determine an amount of a displacement between the at least one semiconductor laser and the surface based on a change in the sensed electrical characteristic of the at least one semiconductor laser.

7. The sensing system of claim 1, further comprising at least one optical element to focus the laser light on the surface.

8. The sensing system of claim 7, wherein the at least one optical element is also configured to focus at least a portion of the laser light that is emitted from the at least one semiconductor laser and that is reflected from the surface back into the at least one semiconductor laser.

9. The sensing system of claim 8, wherein the at least one semiconductor laser is configured such that laser light reflected from the surface and back into the at least one semiconductor laser causes an increase in an electrical current in the at least one semiconductor laser.

10. The sensing system of claim 1, wherein the at least one semiconductor laser comprises a plurality of semiconductor lasers arranged in an array.

11. The sensing system of claim 10, wherein the array is a one dimensional array configured such that different ones of the plurality of semiconductor lasers are positioned at different distances from a surface.

12. The sensing system of claim 10, wherein the sensor is configured to sense an electrical characteristic of each of the plurality of semiconductor lasers.

13. The sensing system of claim 10, wherein the sensor is configured to determine a direction of a displacement between the plurality of semiconductor lasers and the surface based on sensed electrical characteristics of the plurality of semiconductor lasers.

14. The sensing system of claim 10, wherein the plurality of semiconductor lasers are arranged in at least one of a two dimensional array and a three dimensional array.

15. The sensing system of claim 14, wherein the array is arranged such that different ones of the semiconductor lasers are positioned at different distances from the surface.

16. An imaging device, comprising:
a sensor array for sensing optical characteristics of an object and outputting a display signal;
at least one semiconductor laser configured to emit a beam of laser light toward a surface of the object; and
a detector for detecting an electrical characteristic of the at least one semiconductor laser, wherein a change in the detected electrical characteristic of the at least one semiconductor laser correlates to a displacement between the at least one semiconductor laser and the surface of the object.

17. The imaging device of claim 16, further comprising at least one optical element for focusing light from the object onto the sensor array.

18. The imaging device of claim 17, wherein the detector is configured to output a separation signal representative of a separation distance between the imaging device and the object, and wherein light from the object is focused onto the sensor array based on the separation signal.

19. The imaging device of claim 18, wherein a position of at least one of the object, a lens element, the at least one optical element, and the sensor array, is varied in response to the separation signal to focus light from the object onto the sensor array.

20. The imaging device of claim 16, wherein the sensor array comprises at least one of a charge coupled device and a smart pixel array.

21. The imaging device of claim 16, wherein the at least one semiconductor laser comprises at least one of a vertical cavity surface emitting laser and an edge emitting laser.

22. The imaging device of claim 21, wherein the sensor array and the at least one semiconductor laser are formed on a single semiconductor chip.

23. The imaging device of claim 22, wherein the detector is also formed on the semiconductor chip.

24. The imaging device of claim 16, wherein the at least one semiconductor laser comprises a plurality of semiconductor lasers arranged in an array.

25. The imaging device of claim 24, wherein the array is a one dimensional array configured such that different ones of the plurality of semiconductor lasers can be positioned at different distances from an object.

26. The imaging device of claim 24 wherein the array is at least one of a two dimensional array and a three dimensional array, and wherein the array is configured such that different ones of the plurality of semiconductor lasers can be positioned at different distances from an object.

27. The imaging device of claim 24, wherein the detector is configured to detect an electrical characteristic of each of the plurality of semiconductor lasers.

28. The imaging device of claim 24, wherein the detector is configured to detect a direction of a displacement between the plurality of semiconductor lasers and the object based on a change in detected electrical characteristics of the plurality of semiconductor lasers.

29. The imaging device of claim 16, wherein the detector is configured to output a position signal indicative of an amount and a direction of a displacement between the at least one semiconductor laser and the object.

30. The imaging device of claim 29, further comprising a positioning device for moving at least one of the imaging device, and the object.

31. The imaging device of claim 30, wherein the positioning device is configured to maintain a substantially constant separation distance between the sensor array and the object, based on the position signal, as the imaging device is moved relative to the surface of the object.

32. A method of determining a distance, comprising the steps of:
positioning at least one semiconductor laser adjacent a surface;
causing the at least one semiconductor laser to emit a beam of laser light toward the surface;
detecting an electrical characteristic of the at least one semiconductor laser; and
determining a distance between the at least one semiconductor laser and the surface based on the detected electrical characteristic.

33. The method of claim 32, wherein the detecting step comprises detecting an electrical current of the at least one semiconductor laser.

34. The method of claim 32, wherein the positioning step comprises positioning the at least one semiconductor laser such that at least a portion of the laser light emitted by the at least one semiconductor laser is reflected from the surface and back into the at least one semiconductor laser.

35. The method of claim 34, wherein the detecting step comprises detecting an electrical characteristic of the at least one semiconductor laser that is caused, in part, by laser light that is reflected from the surface back into the at least one semiconductor laser.

36. The method of claim 32, wherein the positioning step comprises positioning at least one of a vertical cavity surface emitting laser and an edge emitting laser adjacent the surface.

37. A method of detecting a displacement, comprising the steps of:

positioning at least one semiconductor laser adjacent a surface;

causing the at least one semiconductor laser to emit a beam of laser light toward the surface;

moving one of the at least one semiconductor laser and the surface with respect to the other;

sensing an electrical characteristic of the at least one semiconductor laser; and detecting at least one of a direction and an amount of a displacement between the at least one semiconductor laser and the surface based on the sensed electrical characteristic.

38. The method of claim 37, wherein the positioning step comprises positioning a plurality of semiconductor lasers arranged in an array adjacent a surface, and wherein the sensing step comprises sensing electrical characteristics of at least two of the plurality of semiconductor lasers.

39. The method of claim 38, wherein the detecting step comprises comparing a change in an electrical characteristic of one semiconductor laser to a change in an electrical characteristic of at least one other semiconductor laser.

40. The method of claim 37, wherein the positioning step comprises positioning a plurality of semiconductor lasers arranged in a two dimensional array adjacent the surface, and wherein the array is configured such that different ones of the semiconductor lasers are located at different distances from the surface.

41. The method of claim 37, wherein the positioning step comprises positioning at least one of a vertical cavity surface emitting laser and an edge emitting laser adjacent a surface.

42. A method of focusing an optical detector array on an object, comprising the steps of:

positioning an optical detector array adjacent an object;

positioning at least one semiconductor laser adjacent the object;

causing the at least one semiconductor laser to emit a beam of laser light toward the object;

detecting an electrical characteristic of the at least one semiconductor laser; and focusing the optical detector array on the object based on the detected electrical characteristic of the at least one semiconductor laser.

43. The method of claim 42, wherein the focusing step comprises moving at least one of the object, the optical detector array and an optical focusing element based on the detected electrical characteristic of the at least one semiconductor laser.

44. The method of claim 42, wherein the step of positioning at least one semiconductor laser adjacent the object comprises positioning a plurality of semiconductor lasers arranged in an array adjacent the object, wherein the array is positioned such that different ones of the plurality of semiconductor lasers are positioned at different distances from the object.

45. The method of claim 44, wherein the detecting step comprises comparing an electrical characteristic of a first semiconductor laser to an electrical characteristic of at least one other semiconductor laser and generating a focusing signal.

46. The method of claim 45, wherein the focusing step comprises moving at least one of the object, the optical detector array and a focusing optical element, based on the focusing signal, to focus the optical detector array on the object.

47. A system for obtaining information about a target material, comprising:

at least one semiconductor laser configured to emit a beam of laser light toward a target material;

an optical system configured to focus the beam of laser light on a selected interrogated position on the target material, and to conduct light from the interrogated position back to the at least one semiconductor laser; and a detector configured to detect an electrical characteristic of the at least one semiconductor laser, wherein the detected electrical characteristic is indicative of a characteristic of the interrogated position.

48. The system of claim 47, wherein the at least one semiconductor laser comprises a plurality of semiconductor lasers, and wherein the optical system is configured to focus the beams of laser light produced by the plurality of semiconductor lasers onto a respective plurality of interrogated positions on the sample material and to conduct light from the plurality of interrogated positions back to the semiconductor lasers.

49. The system of claim 47, wherein the optical system is configured to focus the beam of laser light onto an interrogated position inside the sample material.

50. The system of claim 47, further comprising a device for moving the at least one semiconductor laser relative to the sample material so that the beam of laser light produced by the at least one semiconductor laser may by used to interrogate multiple different interrogated positions on the sample material.

51. The system of claim 47, further comprising means for scanning the beam of laser light produced by the at least one semiconductor laser across different portions of the sample material.

* * * * *